United States Patent [19]

El-Sherif

[11] Patent Number: 5,060,307
[45] Date of Patent: Oct. 22, 1991

[54] APPARATUS AND A METHOD COMPRISING AN OPTICAL FIBER MODULATOR, COUPLER, SWITCH, SENSOR AND DISTRIBUTION SYSTEM

[76] Inventor: Mahmoud A. El-Sherif, Photonics Inc. P.O. Box 2815, Upper Darby, Pa. 19082

[21] Appl. No.: 368,254

[22] Filed: Jun. 19, 1989

Related U.S. Application Data

[63] Continuation-in-part of Ser. No. 869,570, Jun. 2, 1986, abandoned, and a continuation-in-part of Ser. No. 79,179, Jul. 29, 1987, abandoned.

[51] Int. Cl.$^5$ .............................................. H04B 10/12
[52] U.S. Cl. ...................................... 359/173; 385/2; 385/16; 385/12
[58] Field of Search ...................... 455/600, 610, 612; 350/96.15–96.16, 96.29–96.3, 96.2; 367/140, 141, 149; 250/227, 231 P, 231 R, 227.21

[56] References Cited

U.S. PATENT DOCUMENTS 4,462,699  7/1984  Shaw ................................ 350/96.15

FOREIGN PATENT DOCUMENTS 2067750  7/1981  United Kingdom ................ 455/612
2182516  5/1987  United Kingdom ................ 455/600

OTHER PUBLICATIONS

Sheem et al., "Acoustic Sensitivity of Single Mode Optical Power Dividers", Optical Letters, vol. 4, #10, 10-71, pp. 322-324.

Primary Examiner—Reinhard J. Eisenzopf
Assistant Examiner—L. Van Beck
Attorney, Agent, or Firm—John S. Munday

[57] ABSTRACT

An optical fiber switch and modulator component comprising applying a signal, such as, an electrical, magnetic, or microwave signal to a single optical fiber which has a region of uncladding, i.e., a region from which the cladding has been removed and coated with an active material, such as, liquid crystal material, which undergoes a change in optical properties due to the field applied and an optical fiber coupler, switch, modulator, sensor and distributor comprising two or more optical fibers which have been twisted about each other at regions of uncladding of the fibers said region of twisting being coated with the active medium so that a light signal focused into one of the fibers is partially or totally repeatedly transferred from said fiber through the active medium to the other fiber or fibers and back again and/or modulated by the external signal wherein the intensity, the phase, and/or the polarization of the optical signal at the receiving end of each of the fibers can be controlled, detected, compared and/or read out.

16 Claims, 3 Drawing Sheets

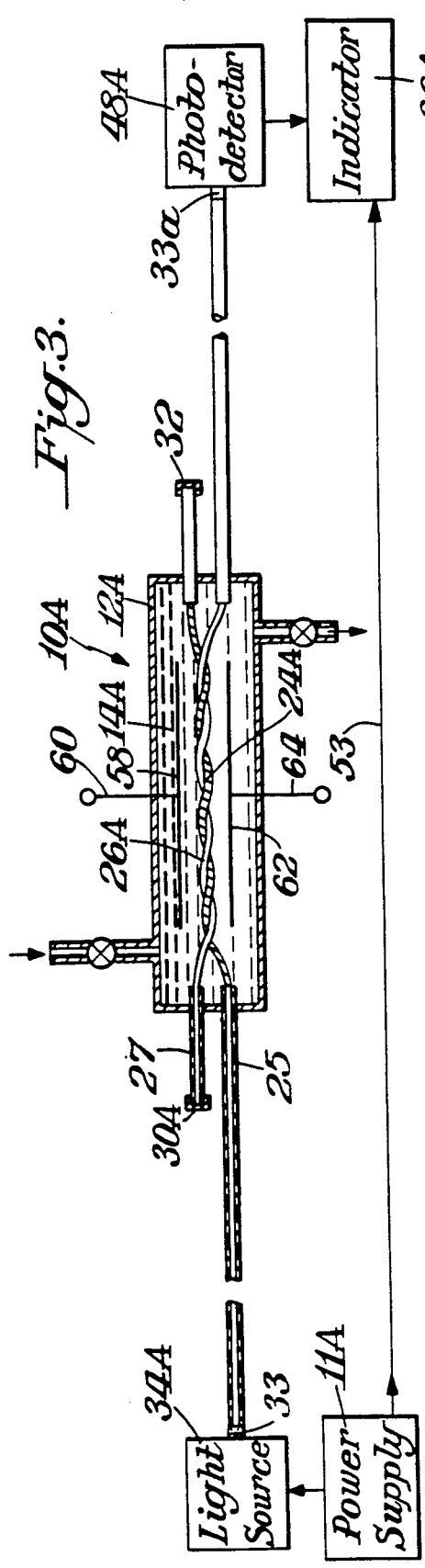
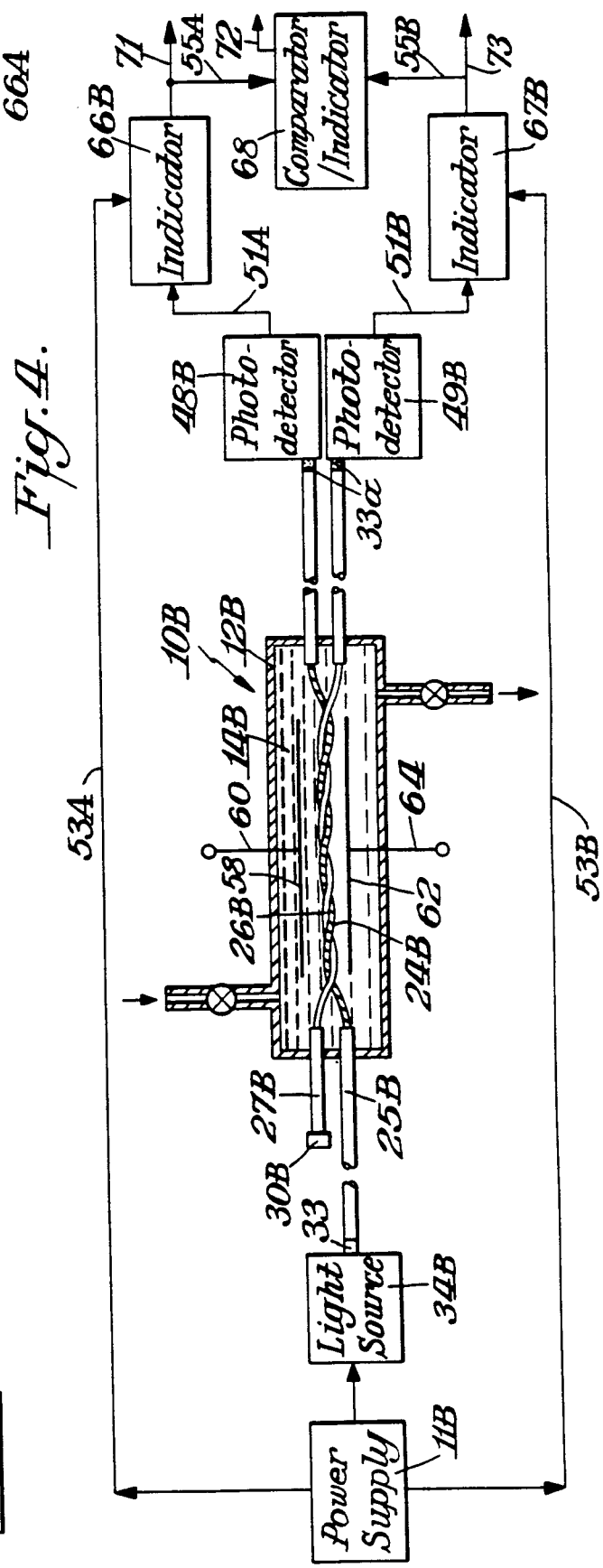

APPARATUS AND A METHOD COMPRISING AN OPTICAL FIBER MODULATOR, COUPLER, SWITCH, SENSOR AND DISTRIBUTION SYSTEM

BACKGROUND OF THE INVENTION

This application is a continuation-in-part of my application Ser. No. 869,570, filed June 2, 1986, now abandoned, and Ser. No. 079,179 filed July 29, 1987.

FIELD OF THE INVENTION

This invention relates to an electro-optic component comprising a modified optical fiber and to fiber optic modulators, sensors, switches and distributors.

DESCRIPTION OF THE PRIOR ART

Because of the importance of integrated optics in the communication industry, a great deal of effort has been expended to reduce insertion loss associated with coupling a light between integrated optical components and fiber links, to the lowest possible level. Such components are multiplexers, modulators, couplers, switches and sensors. There also exists a need for a fiber optic coupler which is tunable for high accuracy, inexpensive, easily fabricated and one which can be used without the problems of coupling the light signal from or to the device.

I have invented such components which use either one optical fiber having a small area from which the cladding material has been removed and replaced with an electro-optic active material (modified cladding), which is sensitive to electromagnetic fields and should satisfy the conditions: (a) its index of refraction is equal to the index of the fiber clad, and (b) in the presence of an external electromagnetic field, the index of refraction of the active material should increase. I have discovered tuning can be controlled by applying an external electromagnetic field to the device across the region of coating with active medium or material. My device can be used by using a single fiber. Also it can be used as an electromagnetic field sensor for determination of the applied external signal. My invention provides a fiber optical modulator, switch and distribution system which is achieved by providing an external signal to two or more cladded optical fibers etched in the region of interaction to remove the cladding and then applying with a predetermined uniform twisting of two or more of said fibers at the region of uncladding and coating the region with an active medium. The twisting is used to keep the various optical fibers sufficiently closely spaced without using any complicated manufacturing technique or device. The twisting prevents movements of the fibers in relation to each other. The active medium or material coating in the region of twisting coats the unclad fibers between the two twisted fibers, controls energy transferred between the two fibers and provides modulation of the signal transmitted in each optical fiber when an external signal is applied.

It is a further object of this invention to provide such a system which employs a fiber optic coupler to split the light beam to more than one channel and control the coupled energy in each channel by changing the optical properties of the active medium.

It is an object of this invention to provide a system using one optical fiber or two or more optical fibers which employs optical intensity modulation by the continuous changing of the optical properties of the active medium resulting from external signals applied to the active medium, e.g. electrical, magnetic, electromagnetic or microwave signals, and can be used for the determination of these external signals.

SUMMARY OF THE INVENTION

This invention is directed to the combination of an external signal applied to a single optical fiber or to two or more optical fibers having a region where the cladding material has been removed and replaced with an electro-optic active medium where two, three, four or more optical fibers are twisted together to provide close proximity between the fibers carrying a light signal. The optical fiber or fibers are twisted together at an area where the cladding material has been removed and replaced with an active material to produce a modified cladding.

This invention is also directed to an apparatus for switching, intensity modulating, sensing, transmitting or distributing an optical signal propagating in an optical fiber consisting of a core surrounded by a cladding layer comprising:

(a) one optical fiber or two or more optical fibers having the passive cladding material removed from a portion of the optical fiber or fibers to produce an uncladded section of the fiber or fibers;

(b) an active medium comprising an electro-optic active material coating the unclad section or sections to produce a coated unclad section of the fiber, said active material having an index of refraction equal to the index of refraction of the passive clad of the fiber and can be increased by applying an external electromagnetic field; and (c) an external signal means applied to the electro-optic active material coated unclad section to modulate or switch the light signal transmitted through the fiber; and (d) means for detecting and reading out the light signal transmitted in the optical fiber.

This invention is also directed to a method for modulating, switching or distributing a light signal being transmitted through an optical fiber consisting of a transparent core surrounded by a cladding layer comprising applying an external signal to a section of the optical fiber which has had the cladding material removed and said section is immersed in an active medium comprising an optically active material, such as, liquid crystal.

This invention is directed to the device which uses as the applied signal, a signal such as an electrical, magnetic, electromagnetic or microwave applied to the region of uncladding and to a device using solutions having large electro-optic and/or magneto-optic effect as the active medium.

BRIEF DESCRIPTION OF THE DRAWINGS

FIG. 3, FIG. 4, FIG. 5 and FIG. 6 are schematic cross-sectional views of alternate embodiments of this invention.

DESCRIPTION OF THE PREFERRED EMBODIMENTS

The devices described herein are conveniently discussed by reference to the drawings, although it is to be understood that the drawings are referred to only for purposes of illustration and example and the scope of the invention is not limited thereto.

Figure 1:
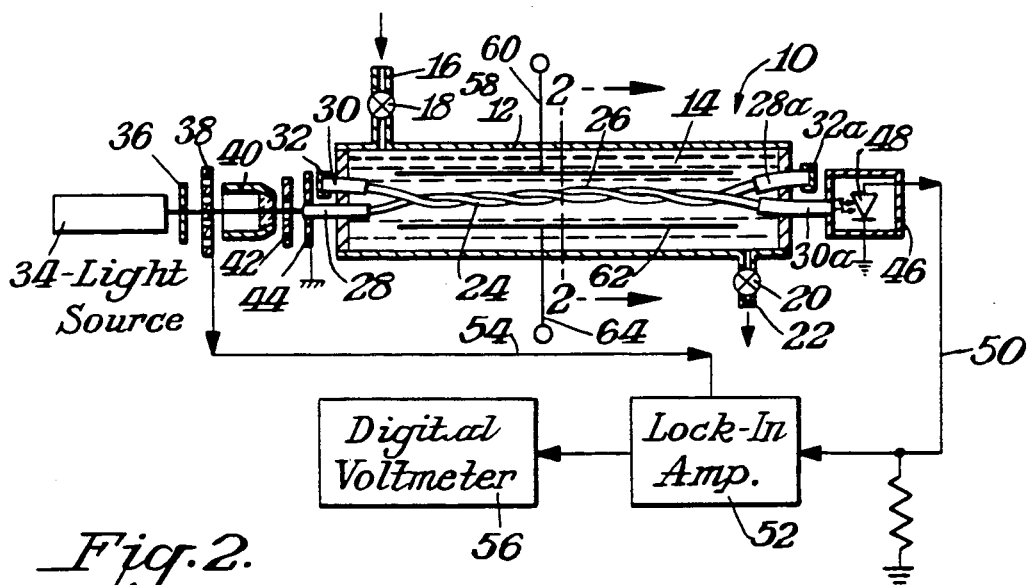
FIG. 1 is a schematic cross-sectional view of a device of this invention using two optical fibers immersed in a liquid crystal as an active clad material.
Figure 2:
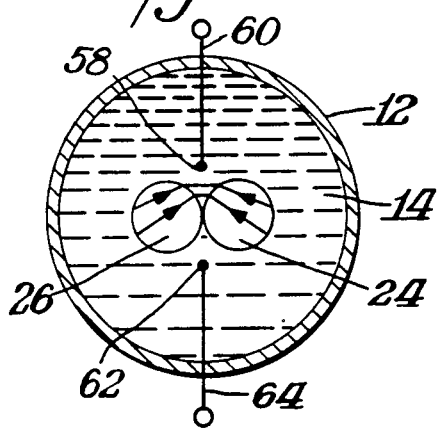
FIG. 2 is a cross-sectional view of the device of FIG. 1 taken along line 2—2 of FIG. 1 showing the path of the light signal transferring from one optical fiber to another optical fiber.

In FIG. 1 and FIG. 2 a coupling device 10 has a container 12 which holds electro-optic or magneto-optic medium or material, such as, a liquid crystal 14, which is introduced into the container by means of inlet tube 16 having a valve 18 and which exits from the container by means of outlet tube 22 having a valve 20. A first optical fiber having a first end 28 and a second end 28a and having an uncladded portion thereof 24 is introduced into one end of a container. A second optical fiber having a first end 30 and a second end 30a and having a region of uncladding 26 which is introduced in the same end of the container as the first fiber. The two fibers are twisted about each other in the region of uncladding in a manner to prevent motion of the fibers relative to each other.

Both second ends of two optical fibers downstream from the region of uncladding exit from the container. The fibers are arranged so that the region of cladding adjacent on both sides of the region of uncladding will be immersed in the active medium to prevent loss of optical signal and to permit the long distance transmission of optical signal in the fibers. The first end of the second fiber and the second end of the first fiber are capped with a light absorber, such as, black cap light absorbing caps 32 and 32a, respectively. Alternatively, the cap can be a mirrored surface formed by deposition of silver on the end of the fiber to give a reflective surface. A light source 34 is operatively connected to the first end of the first optical fiber to place a light signal in the cladded portion of the fiber 28 through an attenuator 36, through a conventional light chopper 38, then through a lens 40, then through a pin hole 42 to the first end of the optical fiber held in proper alignment by support means 44. A phase signal 54, from the chopper 38 is preferably used to increase the sensitivity in the device or by using a low frequency signal to drive a light source such as a laser diode or LED or other light source. The optical signal in the fiber passes to the region of twisting where the optical signal is modulated by an applied external electromagnetic field transducers 58 and 62 applied by means of electrode 60 and 64 to the region of uncladding and coating with active material said region being a region of modified cladding. A cross-sectional cut along various points of the twisted fiber would show that the optical signal is totally in one fiber or the other or partially in one fiber and partially in the other. The presence of the external field modulates the optical signal. The optical signal downstream of the twisted region exits from the container by means of the second end of the second fiber which is operatively connected to a photoelectric device 46 for converting the optical signal received to an electrical signal by means of a photodetector 48. The electrical signal generated is conveyed by line 50 to a lock-in amplifier 52 where a reference electric signal 54 from the chopper is used to increase the sensitivity of the device. The output of the lock-in amplifier is read out by a digital voltmeter 56 operatively connected to the lock-in amplifier 52.

In FIG. 2, shows the path that the optical signal is believed to take as it passes from the first fiber 24 through the active medium 14 to the second fiber 26. Not shown is the path of the optical signal as it passes from the second fiber through the medium to the first fiber which is believed to occur downstream from the cross-sectional cut of the twisted region shown by FIG. 2. This transfer is repeated a plurality of times along the twisted path.

In FIG. 3, an alternate embodiment 10A is shown wherein a first cladded fiber 25, is operatively connected to a light source 34A which is powered by power supply 11A. The first fiber and a second cladded optical fiber 27 have a light absorption means 30A and 32 each at one end thereof. The two optical fibers are introduced into one end of a container 12A holding the active medium 14A. The portion of the first fiber in the container has an uncladded region 24A where the cladding has been etched or otherwise removed therefrom and said region is twisted about a similarly etched uncladded region 26A of the second fiber to provide close contact with the first fiber. The region of twisting as well as the regions of cladding of both fibers immediately adjacent to the region of twisting is immersed or placed in the active medium 14A.

In FIG. 3, the downstream end of the first fiber is capped with a light absorption means 32 at a point downstream from the twisted region. The optical signal in the second fiber downstream of the region of twisting is detected by a photodetector 48A and the detected signal is compared by means of an indicator 66A to a reference signal 53 from the power supply. The light source and the photodetector are focused to the respective optical fibers by glue welds 33 and 33a which can be an epoxy resin having an index of refraction of the fiber. The electrodes 60 and 64 for applying an external signal are placed on opposite sides of the twisted pair.

In FIG. 4, another alternate embodiment 10B is shown wherein a first cladded fiber 25B is operatively connected to a light source 34B having a power source 11B using a glue weld 33. A second cladded optical fiber 27B has a light absorption means 30B attached to a first end thereof. The two fibers are introduced into one end of a container 12B holding an active medium 14B. The portion of the first fiber in the container has an uncladded region 24B where the cladding layer of the fiber has been etched or otherwise removed therefrom and said region is twisted about a similarly etched uncladded region 26B of the second fiber to provide close contact between the two fibers at the regions of uncladding and prevent movement of the fibers.

Figure 5:
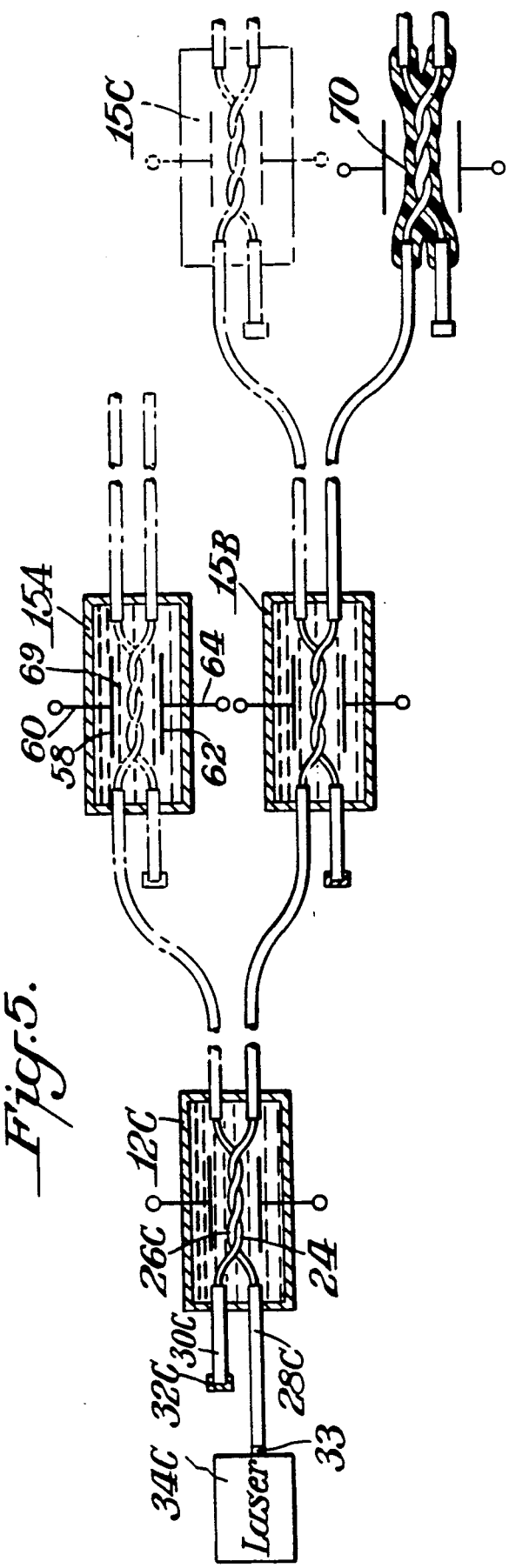

In FIG. 4 and FIG. 5, an applied field or a transduced signal is placed across the region of twisting by means of element 60 and 64 leading to an electrode or a microwave cavity or other means for applying an external field 58 and 62. Element 60 may be a means of applying an electrical, magnetic and/or microwave signal to the active medium to increase the index of refraction of the active medium. The two fibers leaving the container are each directed and focused by glue welds 33a to two separate photodetectors 48B and 49B. The electrical signal generated by the light signal in photodetector 48B is conveyed by line 51A to an indicator 66B which amplifies the electric signal and eliminates noise by reference to a reference signal 53A from the power supply and the amplifier signal can be read out by line 71 or conveyed by line 55A to comparator/indicator 68. Similarly, the electrical signal generated in photodetector 49B is conveyed by line 51B to indicator 67B which amplifies the electrical signal and eliminates noise by reference to a reference signal 53B from the power supply and the amplified signal can be read out by line 73 or can be conveyed by line 55B to the comparator/indicator 68 for final comparison and read out by line 72. In FIG. 4, by applying different voltage, one can shift the amount of optical signal in each fiber and, thereby, produce a tunable coupler. Also, one can control the stability of the system by recording the total received signal.

Figure 7:
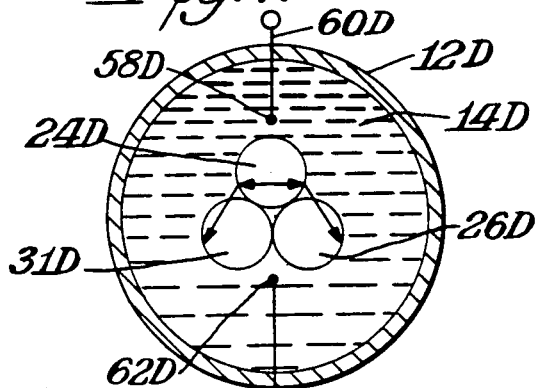
FIG. 7 is a cross-sectional view of the device of FIG. 6 taken along 7—7 of FIG. 6.
Figure 6:
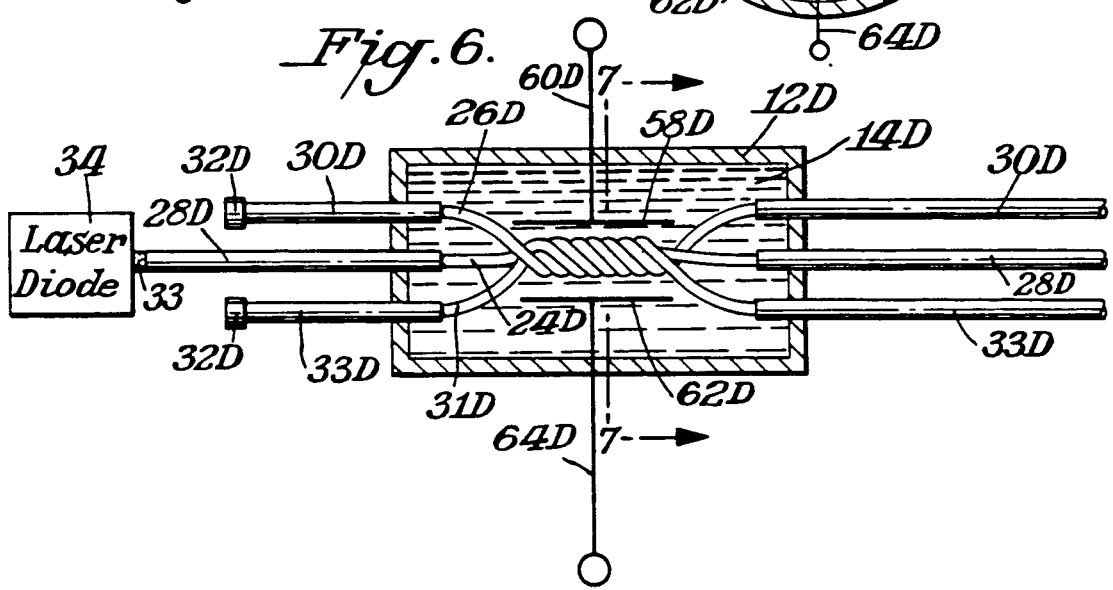

In FIG. 5, another embodiment showing the transmission and distribution of optical signals using the twisted fiber combination, a laser light source 34C focuses an optical signal in a first clad optical fiber 28C having a twisted unclad region 26C immersed in a liquid or fused solid active medium container 12C, a second clad optical fiber 30C having one end capped with a light absorption means 32C and having an unclad region 24 is twisted about the first fiber at the region of uncladding. The fibers exiting the container are conveyed even long distances, each to other containers 15A, 15B and 15C containing active medium which can be a fused solid 69. In each case the fibers are twisting about other in the region of uncladding. The optical fibers from the other containers downstream from the first container 12C can be further coupled by using the twisted fiber/active medium combination or without a container in the case of the use of a solid medium 70 and so on to produce a distribution network. As a further embodiment, a fiber containing an optical signal can have another signal induced into it of a different frequency or other signals of different frequencies which can be each separately read out by means of an indicator capable of read out of different frequencies. The embodiment of FIG. 5 can be used as a multiplexer by combining different optical signals from different sources and combining them on one fiber using different regions of uncladding on the same fiber as points of input of the signal using the twisted optical fiber combination. Also, the device can be modified to serve as a demultiplexer in which a fiber having many optical signals can be channeled to separate the signals to different locations. The total energy at the source end can be divided to any number of channels with equal or different ratios. In FIG. 6 and FIG. 7, another embodiment of the invention shows that more than two fibers can be used and twisted together at a region of uncladding using a laser light source 34 to focus a light beam to a first end of a first optical fiber by glue weld 33. A second and a third cladded fiber 30D and 33D respectively, each having its end capped by a light absorption means 32D are thereafter passed through a container 12D holding active medium 14D. Uncladded portions of said three optical fibers 24D, 26D and 31D are intertwined by being twisted upon each other and immersed at said point of twisting into the active medium and thereafter exited from the container where they can be compared or further coupled with other optical fibers to form a distribution system or directly passed to detectors.

In FIG. 7, the path of the optical signal is believed to take when transferring from the first fiber to the second and to the third fibers is shown. As can be seen, the novel combination of a single or twisted optical fibers, uncladded or etched at the interaction region (the twisted region) and coated with a sensitive electro-optic or magneto-optic material disclosed provides for optical intensity modulation and can be used for several applications such as electro-optic, magneto-optic, electromagnetic and microwave applications.

Figure 8:
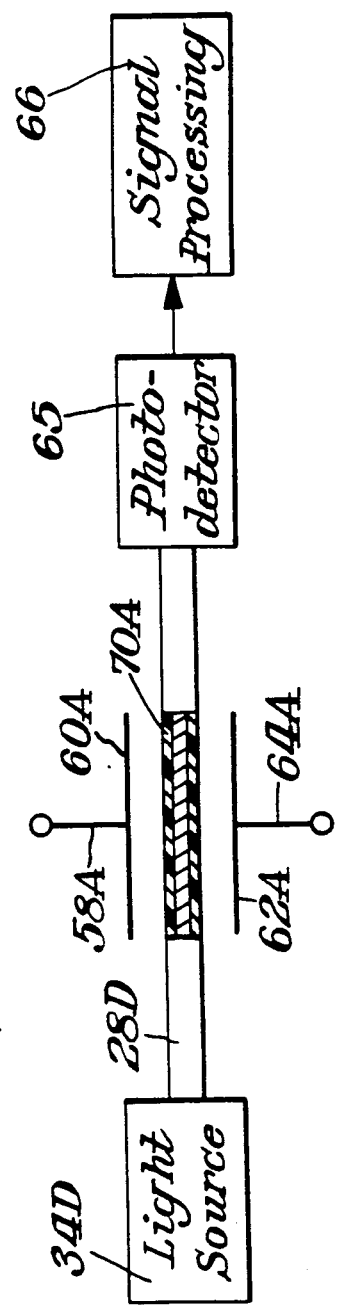
FIG. 8 is an alternate embodiment of this invention using a single optical fiber.

FIG. 8 shows the embodiment wherein one optical fiber 28D has had a portion of the cladding material removed and replaceed with active material 70A. A light signal from the light source 34D transmitted in the optical fiber is modulated by an external signal applied by means of electrodes 58A and 64A to the region of uncladding and coating detected by photodetector 65 and processed by means of a signal processing means 66.

In the novel combinations shown in FIGS. 1, 3, 5, and 8, the continuous changing of the applied external electromagnetic field results in continuous changing of the refractive index of the modified cladding which provides optical intensity modulation of the propagating optical signal.

The moved components of this invention shown in FIG. 8, can be used as a switch. Switching-off the optical signal in the optical fiber occurs when the applied signal changes the index of refraction of the active material to be the same as the index of the core of the optical fiber.

The geometrical dimensions of the twisted region can be adjusted for maximum sensitivity depending upon the characteristic of the active medium or material without and with applying the unknown external field. The twisted optical fiber with active medium combination can be used in an optical modulator, sensor, coupler or transducer depending on the:

(a) optical and geometrical properties of the twisted fibers.
(b) the optical properties of the active medium.
(c) the induced change of the optical properties of the active medium.

The induced change of the optical properties of the active material can be achieved in different ways depending on the type of the unknown parameter. External electrode, microwave cavity, or magnetic field can be used in the active region to introduce changes in the optical properties of the active material.

EXPERIMENTAL

The removal of the cladding from a GL-75 optical fiber (a multimaterial glass fiber was effected over a length of 2 cm with hydrofluoric acid with a 5% cncentration). The etching rate was 1 um/min. This fiber has core and cladding refractive indices of 1.6 and 1.48, respectively. It is a multimode fiber with a core diameter of 68 um and a total core—cladding—diameter of 75 um. The etch fiber was coated with neumatic liquid crystal ZL12976 supplied by EM Chemical Company. It has an optical anisotropy equal to $n = +0.1205$ with an extraordinary refractive index $N_e$ along the molecule director equal to 1.6167 and an ordinary refractive index $N_o = 1.4962$ at 20° C. and 589 nm wavelength.

Applying a signal at the region of uncladding and modified cladding can be accomplished using small electrodes having dimensions of 0.25 to 5 cm or larger in width to about 0.5 to 20 cm or longer in length depending upon the length of the uncladded region.

The use of my novel combination for modulation provides many advantages:

(i) the use of external modulation eliminates difficulties and disadvantages that arise using direct modulation of the laser light source of the transmitted light signal;

(ii) modulation is achieved without cutting and splicing the optical fiber core eliminating insertion losses;

(iii) application to high frequency and microwave modulation;

(iv) application for both analog and digital modulation;

(v) application for both communications and sensors; and (vi) with the technique, modulation can occur at different locations on the optical transmission line, so that an optical fiber can carry information originating from different sources located at different points along the transmission line and not only from a single source using direct modulation.

The type of the active material used is dependent on the type of external signal used which causes a change of optical properties of this material.

The optical fibers used herein are commercially available. The fibers can be composed of glasses and polymers, such as, soft glass, and ultra-high pure glass, nylon, poly(methyl methacrylate), transparent polyurethane, polystryrene and other transparent resins. The fibers conventionally are composed of a core surrounded by a cladding layer. The index of refraction of the cladding layer is different than the index of refraction of the core material and is slightly lower than the core material.

The section of the optical fiber coated with a modified cladding material is first etched to remove the original cladding material. Etching is accomplished by conventional methods such as dissolving the cladding from the fiber using a diluted acid solution such as hydrofluoric acid. The etching can be accomplished using other solvents or reagents to remove the cladding layer. The fibers used in this invention can etched as follows:

The optical fiber is placed in a 5 to 10%, by weight, hydrofluoric acid solution wherein the rate of etching is about 5 micrometers per minute for glass or multimaterial glass fiber.

Etching of a fiber is relatively easily controlled. Control of the etching can be achieved by observing an optical signal transmitted in the fiber being etched. As soon as the optical signal changes, the process is terminated by immediate dilution of the solution solvent with a large quantity of water. The beginning of the change of optical signal signifies that the etching has reached the interface between the core and the clad layer.

The optical fiber employed herein is a single mode or multimode fiber having a single mode or multimode fiber having a cross-section diameter of about 10 microns or less to 500 microns or greater.

The unclad region of the fiber, which is twisted about another fiber or more than one other fiber as shown in FIG. 6, has a length of about 0.2 to 10 cm or higher.

The amount of twisting or pitch of the fibers used can be defined as the number of turns the fibers make about each other. Dependent upon the material and the diameter of the fiber and the active medium used, in general, about 0.2 to 5 turns per cm and preferably 0.5 to 3 turns per cm are used. For purposes of illustration, a fiber having a 50 micron diameter would be twisted 2 to 3 turns per cm whereas a fiber having a diameter of 200 microns would be twisted, a half turn cm. The twisting causes the surfaces of the different fibers to come into intimate or close surface to surface contact with each other, but the active medium wets or otherwise fills the space or voids in the region of contact of the twisted fibers.

The active medium or modified cladding, preferably, is a liquid, for low-frequency applications. However, a solid which has been melted and then allowed to solidify, can be used as the active medium. The medium may be a mixture or a solution of liquids or solids. The active medium can be organic compounds, mixtures and solutions such as liquid crystal and a solid such as poly(vinylidene fluoride) or a ceramic and other electro-optic or magneto-optic material provided their optical properties are effected by the applied electromagnetic signal used.

The light source preferably is a laser light source. It is convenient to use laser diode or light emitting diode as the light source. The source used emits lights in the infrared, the visible and/or the near ultraviolet regions of the spectrum.

In order to prevent losses of optical signal it is important that the portion of the cladded fiber immediately adjacent to the uncladded region be completely immersed in the active medium, where the index of refraction of the active material should be equal to that of the fiber clad material.

It is apparent that many devices can be produced using my novel combination of an electromagnetic field applied to the region of modified cladding of an optical fiber containing light signal.

The scope of the present invention is illustrated by the above description and defined in the following claims.

I claim:

1. An electrooptic apparatus selectively operable for coupling, switching, modulating, or distributing an optical signal transmitted in at least one optical fiber, comprising:

(a) a first optical fiber and a second optical fiber, each of said fibers having a core and cladding material surrounding said core and each of said fibers having a region wherein the cladding has been removed to form a region of uncladding, said optical fibers being twisted about each other to provide surface contact between said fibers at said region of uncladding while preventing mechanical movement of said fibers in relation to each other;

(b) an active modified material surrounding the region of uncladding to form an electrooptic modified cladding, said modified cladding having an index of refraction which is changed by an applied external electromagnetic field;

(c) a light source means focused to provide an optical signal to said first optical fiber;

(d) means for applying an external electromagnetic field to said region of modified cladding to change said index of refraction, whereby the effect of said external field modulates the optical signal in said first optical fiber and conveys said signal through said active modified material to said second optical fiber;

(e) detector means positioned on each optical fiber downstream from said light source and said region of modified cladding for detecting optical signals in said first and second optical fibers; and (f) indicator means coupled with said detector means to amplify any output signal of said detector while also providing a reference signal from a power supply to provide a noise free indicator output, said indicator output including output of each of said fibers for direct read-out or comparative read-out as desired.

2. The apparatus of claim 1, using single mode or multimode fibers of glass, plastic, multimaterial or nylon material.

3. The apparatus of claim 1 wherein the pitch of the twisting of the optical fibers about each other depend on the type of the material and the diameter of the selected fibers.

4. The apparatus of claim 1 wherein the active medium is sensitive to electromagnetic fields and can be selected of liquid solution or fused solid.

5. The apparatus of claim 1 wherein the light transmitted signal is infrared, visible or near ultra-violet light.

6. The apparatus of claim 1 wherein an external signal comprising electric, magnetic, or microwave signal is applied across the region of twisting of the optical fibers whereby there is obtained a continuous change of the optical properties of the active medium.

7. The apparatus of claim 1, operable as an electrooptic coupler, in which said means for applying an external electromagnetic field is adapted to provide a continuous field to said active region to tune the coupling efficiency between said first and second fibers, whereby an optical signal from said light source is said first fiber is partially transferred to said second fiber.

8. The apparatus of claim 1, operable as an electrooptic switch, in which said means for applying an external electromagnetic field is adapted to provide a continuous field to said active region of sufficient strength to totally transfer an optical signal from said light source in said first fiber to said second fiber.

9. The apparatus of claim 1, operable as an electrooptic modulator, in which said means for applying an external electromagnetic field is adapted to provide an external oscillating electromagnetic field to said active region to modulate coupling efficiency in the active region between an optical signal in said first fiber and the optical signal coupled from said first fiber into said second fiber.

10. The apparatus of claim 1, including means for calibrating optical signals at the receiving end of said first and second fibers and calibrating electric signals at said detector output, whereby unknown external electromagnetic fields applied to said modified cladding are sensed or measured.

11. The apparatus of claim 1, including at least two second fibers, each of which is unclad and twisted together with said first fiber and each of the other second fibers in said active region.

12. The apparatus of claim 1, operable as an electrooptic distribution system, in which said means for applying an external electromagnetic field is adapted to control distribution of light from said light source in said first fiber to said second fibers.

13. An electrooptic apparatus selectively operable for switching and modulating an optical signal transmitted in only one optical fiber, comprising:
 (a) an optical fiber having a core and cladding material surrounding said core and having a region wherein the cladding has been removed to form a region of uncladding;
 (b) an electrooptic active modified material surrounding the region of uncladding to form a modified cladding, said modified cladding having an index of refraction which is changed by an applied external electromagnetic field;
 (c) a light source means focused to provide an optical signal to said optical fiber;
 (d) means for applying an external electromagnetic field to said region of modified cladding to change said index of refraction, whereby the effect of said external field modulates the optical signal in said optical fiber and radiate said signal into said active modified material;
 (e) detector means positioned on said optical fiber downstream from said light source and said region of modified cladding for detecting optical signals in said optical fiber; and
 (f) indicator means coupled with said detector means to amplify any output signal of said detector while also providing a reference signal from a power supply to provide a noise free indicator output, said indicator output including output of said fiber for direct read-out.

14. The apparatus of claim 13, wherein said means for supplying an electromagnetic field is adapted to modulate the index of refraction of said electrooptic modified cladding inducing intensity modulation in the optical signal transmitted through said fiber by means of optical radiation in said modified region.

15. The apparatus of claim 13, wherein said means for supplying an electromagnetic field is adapted to apply a continuous field to cause a switch-off of an optical signal in said fiber by increasing the index of refraction of said modified cladding to be equal to or greater than the index of refraction of said fiber core, said signal being completely radiated in said active medium to thereby stop transmission of said signal through said fiber core.

16. The apparatus of claim 13, which includes calibration means for calibrating said output of said optical signal means for sensing and measuring unknown external electromagnetic field applied to said modified cladding.

* * * * *